United States Patent
Murali et al.

(10) Patent No.: US 10,783,713 B2
(45) Date of Patent: Sep. 22, 2020

(54) TRANSMUTATION OF VIRTUAL ENTITY SKETCH USING EXTRACTED FEATURES AND RELATIONSHIPS OF REAL AND VIRTUAL OBJECTS IN MIXED REALITY SCENE

(71) Applicant: International Business Machines Corporation, Armonk, NY (US)

(72) Inventors: Srikanth K. Murali, Bangalore (IN); Padmanabha Venkatagiri Seshadri, Mysore (IN); Vijay Ekambaram, Chennai (IN); Shinoj Zacharias, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 16/122,420

(22) Filed: Sep. 5, 2018

(65) Prior Publication Data
US 2020/0074736 A1 Mar. 5, 2020

(51) Int. Cl.
*G06K 9/46* (2006.01)
*G06T 19/00* (2011.01)
(Continued)

(52) U.S. Cl.
CPC .......... *G06T 19/006* (2013.01); *G06F 16/532* (2019.01); *G06F 16/5854* (2019.01); *G06K 9/00671* (2013.01); *G06T 7/11* (2017.01)

(58) Field of Classification Search
CPC .... A61K 39/00; A61K 39/025; Y02A 50/407; G01N 33/5308; G01N 33/536;
(Continued)

(56) References Cited

U.S. PATENT DOCUMENTS 9,038,127 B2  5/2015  Hastings et al.
9,348,141 B2  5/2016  Bar-Zeev et al.
(Continued)

FOREIGN PATENT DOCUMENTS

CN  201610131374 A   7/2016
EP      3012712 A1   4/2016

OTHER PUBLICATIONS

Cao et al., "Edgel Index for Large-Scale Sketch-based Image Search," IEEE Conference on Computer Vision and Pattern Recognition (CVPR), 2011, pp. 761-768.
(Continued)

*Primary Examiner* — Xin Jia
(74) *Attorney, Agent, or Firm* — Robert A. Voigt, Jr.; Winstead PC

(57) ABSTRACT

A method, system and computer program product for enriching user sketched virtual objects in mixed reality scenes to provide more relevant content. Objects, including a virtual entity sketch and real and virtual objects, are identified in a mixed reality scene. The features for each of these objects are extracted, such as color, texture, parts, etc. A relative position and connectedness of the virtual entity sketch are computed with respect to the mixed reality scene as an object-object matrix using the extracted features. The object-object matrix is then augmented using open and closed regions of the mixed reality scene to create an inter-object relationship graph. The virtual entity sketch is then transmuted using the inter-object relationship graph. Content may then be retrieved using the transmuted virtual entity sketch. In this manner, content that is more relevant to the user can be retrieved based on augmenting and enriching the virtual entity sketch.

20 Claims, 6 Drawing Sheets

(51) Int. Cl.
*G06T 7/11* (2017.01)
*G06K 9/00* (2006.01)
*G06F 16/532* (2019.01)
*G06F 16/583* (2019.01)

(58) Field of Classification Search
CPC .......... G01N 33/585; G02B 2027/0138; G02B 2027/0141; G02B 2027/0178; G02B 27/017; G06K 9/00201; G06K 9/00671; G06K 9/18; G06K 9/6201; G06Q 30/0255; G06Q 30/0261; G06Q 30/0267
See application file for complete search history.

(56) References Cited

U.S. PATENT DOCUMENTS

| | | |
|---|---|---|
| 2012/0229508 A1 | 9/2012 | Wigdor et al. |
| 2013/0194259 A1 | 8/2013 | Bennett et al. |
| 2013/0222381 A1 | 8/2013 | Di Censo et al. |
| 2013/0328927 A1 | 12/2013 | Mount et al. |
| 2013/0335405 A1 | 12/2013 | Scavezze et al. |
| 2015/0331576 A1 | 11/2015 | Piya et al. |
| 2015/0356774 A1 | 12/2015 | Gal et al. |
| 2016/0109937 A1* | 4/2016 | Kim .......................... G06F 3/017 345/156 |
| 2016/0217590 A1 | 7/2016 | Mullins et al. |
| 2016/0267720 A1* | 9/2016 | Mandella ................ G06F 1/163 |
| 2018/0239144 A1* | 8/2018 | Woods ................... A63F 13/212 |
| 2020/0004401 A1* | 1/2020 | Hwang ................... G06F 3/017 |

OTHER PUBLICATIONS

Tolias et al., "Asymmetric Feature Maps with Application to Sketch Based Retrieval," arXiv:1704.03946, 2017. pp. 1-9.
Saavedra et al., "RST-SHELO: Sketch-Based Image Retrieval Using Sketch Tokens and Square Root Normalization," Multimedia Tools and Applications, vol. 76, No. 1, 2017, pp. 931-951, See Abstract.
Polsley et al., "SketchSeeker: Finding Similar Sketches," IEEE Transactions on Human-Machine Systems, vol. 47, No. 2, 2017, pp. 194-205, See Abstract.
Xiao et al., "Sketch-based Image Retrieval via Shape Words," Proceedings of the 5th ACM on International Conference on Multimedia Retrieval, Shanghai, China, Jun. 23-26, 2015, pp. 571-574.
University of Washington, "RGB-D Object Recognition and Detection," http://www.cs.washington.edu/research-projects/robotics/rgbd-object-recognition-and-detection, 2017, pp. 1-4.
Dai et al., "Scannet: Richly-Annotated 3d Reconstructions of Indoor Scenes," arXiv: 1702.04405, 2017, pp. 1-22.
Bao et al., "Semantic Structure from Motion," IEEE Conference on Computer Vision and Pattern Recognition, 2011, pp. 2025-2032.
Tateno et al., "When 2.5 D is not Enough: Simultaneous Reconstruction, Segmentation and Recognition on Dense SLAM," IEEE Conference on Robotics and Automation (ICRA), 2016, pp. 2295-2302.
Salas-Moreno et al., "Slam++: Simultaneous Localisation and Mapping at the Level of Objects," Proceedings of the IEEE Conference on Computer Vision and Pattern Recognition, 2013, pp. 1352-1359.
Zhu et al., "DeePM: A Deep Part-Based Model for Object Detection and Semantic Part Localization," arXiv:1511.07131, 2016, pp. 1-18.
Luan et al., "Deep Photo Style Transfer," arXiv: 1703.07511, 2017, pp. 1-9.
Ramachandran et al., "The Science of Art: A Neurological Theory of Aesthetic Experience," Journal of Consciousness Studies, vol. 6, No. 6-7, 1999, pp. 15-51.
Ann-Marie Alcantara, "This New Drawing Experiment from Google is Insanely Addicting," https://www.popsugar.com/news/Google-Auto-Draw-43424279, Apr. 12, 2017, pp. 1-2.
Cohen-Or et al., "Color Harmonization," ACM Transactions on Graphics, vol. 25, No. 3, 2006, pp. 624-630.
Joakim Lindblad, "Fuzzy Sets and Fuzzy Techniques," http://cb.uu.se/~joakim/course/fuzzy/vt10/lectures/L12_4.pdf, Mar. 6, 2010, pp. 1-10.
Udupa et al., "Fuzzy Connectedness and Image Segmentation," Proceedings of the IEEE, vol. 91, No. 10, Oct. 2003, pp. 1649-1669.
Huo et al., "Window-Shaping: 3D Design Ideation by Creating on, Borrowing from, and Looking at the Physical World," Proceedings of the Tenth International Conference on Tangible, Embedded, and Embodied Interaction, Yokohama, Japan, Mar. 2017, pp. 1-9.

* cited by examiner

TRANSMUTATION OF VIRTUAL ENTITY SKETCH USING EXTRACTED FEATURES AND RELATIONSHIPS OF REAL AND VIRTUAL OBJECTS IN MIXED REALITY SCENE

TECHNICAL FIELD

The present invention relates generally to mixed reality environments, and more particularly to transmuting a virtual entity sketch in a mixed reality scene using extracted features and relationships of the real and virtual objects in the mixed reality scene to enable the virtual entity sketch to be used for content retrieval (e.g., advertisements).

BACKGROUND

Mixed reality, sometimes referred to as hybrid reality, is the merging of real and virtual worlds to produce new environments and visualizations where physical and digital objects co-exist and interact in real time. Mixed reality takes place not only in the physical world or the virtual world, but is a mix of reality and virtual reality, encompassing both augmented reality and augmented virtuality via immersive technology.

In mixed reality environments, users may sketch virtual entities (e.g., sketch a virtual flower) in a mixed reality scene, such as via gestures. Currently, there is research in retrieving content (e.g., advertisements) based on sketches. However, current sketch processing tools are limited in retrieving the correct content based on these sketched virtual entities in the mixed reality scene.

SUMMARY

In one embodiment of the present invention, a method for enriching user sketched virtual objects in mixed reality scenes to provide more relevant content comprises identifying objects in a mixed reality scene, where the objects comprise a virtual entity sketch, one or more real objects and one or more virtual objects. The method further comprises extracting features for each of the identified objects. The method additionally comprises computing a relative position and connectedness of the virtual entity sketch with respect to the mixed reality scene as an object-object matrix using the extracted features. Furthermore, the method comprises augmenting the object-object matrix using open and closed regions of the mixed reality scene to create an inter-object relationship graph. Additionally, the method comprises transmuting the virtual entity sketch using the inter-object relationship graph.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
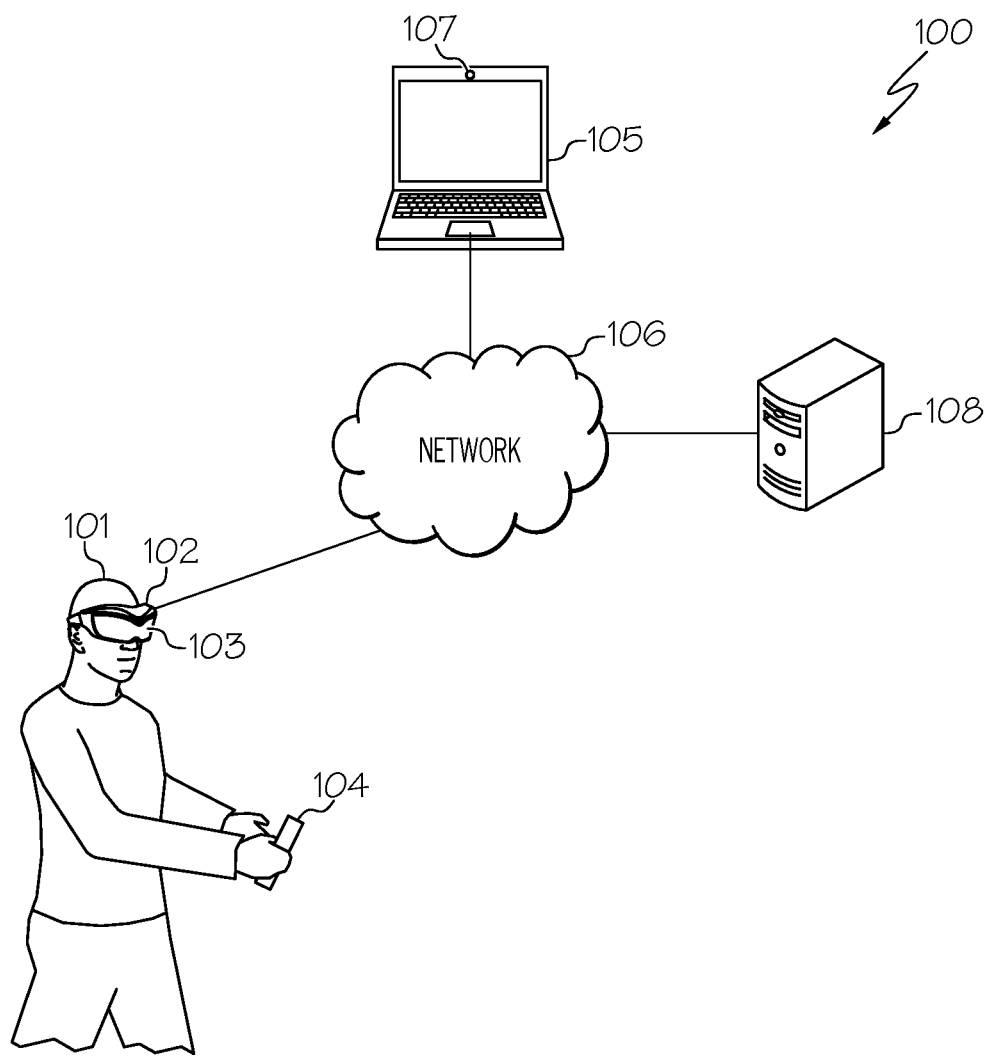
FIG. 1 illustrates a mixed reality system configured in accordance with an embodiment of the present invention.

The present invention comprises a method, system and computer program product for enriching user sketched virtual objects in mixed reality scenes to provide more relevant content. In one embodiment of the present invention, objects, including a virtual entity sketch and real and virtual objects, are identified in a mixed reality scene. A virtual entity sketch refers to a drawing representing the features of a virtual object that may be drawn by a user in the mixed reality scene, such as via gestures. The features for the objects identified in the mixed reality scene are extracted, such as color, texture, parts, etc. A relative position and connectedness of the virtual entity sketch are computed with respect to the mixed reality scene as an object-object matrix using the extracted features. Based on fuzzy connectivity, an object-object matrix is computed which is assigned an objective function. Fuzzy connectivity defines how image elements hang together spatially. In one embodiment, the objective function computes the fuzzy connectedness value based on the relative distance between the object pair (e.g., the virtual entity sketch and a real object in the mixed reality scene), and the likelihood that they share a border. The object-object matrix is augmented using open and closed regions of the mixed reality scene to create an inter-object relationship graph. "Closed regions," as used herein, refer to regions that contain only interior pixels; whereas, "open regions" refer to regions which contain interior and border pixels. In one embodiment, the object-object matrix is used to generate an inter-object relationship graph with edges labelled using the fuzzy connectedness strength and one of the following relationships: (1) if a pair of objects only share the open-ended sub-region containing the border pixels, then the object-pair is treated as an over-lay/appendage of each other, (2) if object A shares an interface with open and/or closed regions of another object B, but is contained within it, then "A is engraved/contained in B," and (3) if object A shares an interface with open and/or closed regions of another object B, but is not contained within it, then "A is embedded in B." The virtual entity sketch is then transmuted using the inter-object relationship graph. For example, features, such as contrast, symmetry, style, aspect ratio and/or viewpoint, of the virtual entity sketch may be transmuted based on the inter-object relationship graph. Transmutation of the virtual entity sketch may also be accomplished by associating objects to the virtual entity sketch. Content may then be retrieved using the transmuted virtual entity sketch. In this manner, content that is more relevant to the user can be retrieved based on augmenting and enriching the virtual entity sketch (transmuted virtual entity sketch) with the extracted relationships between the virtual entity sketch and the real and virtual objects within the mixed reality scene.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates a mixed reality system 100 configured in accordance with an embodiment of the present invention. System 100 is configured to allow a user 101 to participate in a mixed reality environment. A mixed reality environment is the merging of real and virtual worlds to produce new environments and visualizations where physical and digital objects co-exist and interact in real time. Mixed reality takes place not only in the physical world or the virtual world, but is a mix of reality and virtual reality, encompassing both augmented reality and augmented virtuality via immersive technology. In one embodiment, user 101 may wear a mixed reality (MR) headset 102 that includes a display 103 providing a graphical environment for MR generation. The graphical environment includes graphical images and/or computer-generated perceptual information. Display 103 encompasses part or all of a user's field of view.

Exemplary embodiments of headset 102 include a visor, a helmet, goggles, glasses and other similar arrangements. Examples of MR headsets 102 include the HMD Odyssey™ from Samsung® Electronics, the ASUS® mixed reality headset from AsusTek Computer, Inc., the Lenovo Explorer® from Lenovo®, as well as the mixed reality headsets from HP®, Acer® and Dell®. Furthermore, in one embodiment, headset 102 may include any one or more of the following: headphones to provide auditory feedback, vibration means to provide vibration feedback, and other sensors placed on or around the forward facing surface when in use.

Additionally, headset 102 may be utilized in conjunction with one or more motion controllers 104 used to track motion via the movement of the hand(s) of user 101.

System 100 further includes a computing device 105 in communication with display 103 of headset 102 via a network 106, which is capable of generating and/or controlling the graphical environment. Computing device 105 may provide instructions to display 103, for example, by executing program code including an application program related to the MR simulation.

Network 106 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

In one embodiment, computing device 105 may be any type of computing device (e.g., portable computing unit, laptop computer, mobile device, tablet personal computer, smartphone, mobile phone, gaming unit, desktop computer system, workstation, Internet appliance and the like) with the capability of connecting to network 106 and consequently communicating with MR headset 102. In one embodiment, computing device 105 includes a camera 107 and MEMS (microelectromechanical systems) sensors, such as an accelerometer, GPS (Global Positioning System) and a solid state compass, thereby enabling system computing device 105 to be a suitable MR platform. A description of the hardware configuration of computing device 105 is provided below in connection with FIG. 2.

In one embodiment, computing device 105 is configured to augment and enrich a virtual entity sketch in a mixed reality scene so as to enable content retrieval based on the sketched virtual entity. In one embodiment, the virtual entity sketches are augmented and enriched using extracted relationships between the virtual entity sketch with the real world and virtual objects present within the mixed reality scene as discussed further below in connection with FIGS. 3-4, 5A-5D and 6-7.

System 100 further includes a data store 108 connected to computing device 105, such as via network 106. In one embodiment, data store 108 is configured to store the extracted features of the objects (real and virtual objects) in the mixed reality scene as well as "shape words" which are used to compute a relative position and connectedness of the virtual entity sketch with respect to the mixed reality scene as discussed in further detail below. A "shape word," as used herein, refers to a small segment constructed by a group of connected edge pixels. For example, line segments and circular arcs may correspond to shape words. A discussion regarding shape words is provided in Xiao et al., "Sketch-based Image Retrieval via Shape Words," Proceedings of the $5^{th}$ ACM on International Conference on Multimedia Retrieval, Shanghai, China, Jun. 23-26, 2015, pp. 571-574.

System 100 is not to be limited in scope to any one particular architecture. System 100 may include any number of users 101, headsets 102, displays 103, motion controllers 104, computing devices 105, networks 106, cameras 107 and data stores 108.

Figure 2:
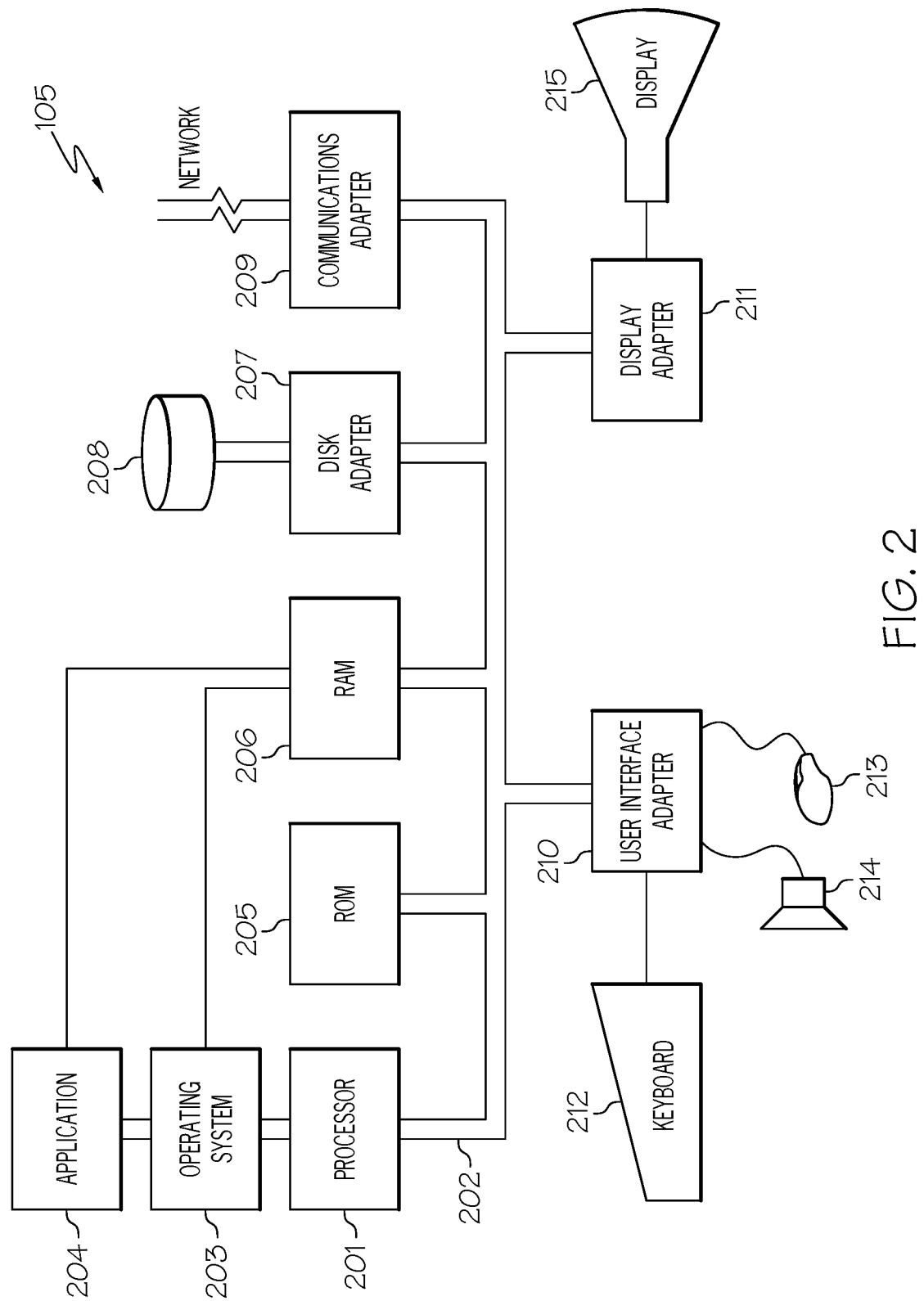
FIG. 2 illustrates an embodiment of the present invention of a hardware configuration of a computing device which is representative of a hardware environment for practicing the present invention.

Referring now to FIG. 2, FIG. 2 illustrates a hardware configuration of computing device 105 (FIG. 1) which is representative of a hardware environment for practicing the present invention. Referring to FIG. 2, computing device 105 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for transmuting a virtual entity sketch in a mixed reality scene using extracted features and relationships of the real and virtual objects in the mixed reality scene to enable the virtual entity sketch to be used for content retrieval (e.g., advertisements) as discussed further below in connection with FIGS. 3-4, 5A-5D and 6-7.

Referring again to FIG. 2, read-only memory ("ROM") 205 is coupled to system bus 202 and includes a basic input/output system ("BIOS") that controls certain basic functions of computing device 105. Random access memory ("RAM") 206 and disk adapter 207 are also coupled to system bus 202. It should be noted that software components including operating system 203 and application 204 may be loaded into RAM 206, which may be computing device's 105 main memory for execution. Disk adapter 207 may be an integrated drive electronics ("IDE") adapter that communicates with a disk unit 208, e.g., disk drive.

Computing device 105 may further include a communications adapter 209 coupled to bus 202. Communications adapter 209 interconnects bus 202 with an outside network (e.g., network 106 of FIG. 1) thereby enabling computing device 105 to communicate with other devices (e.g., headset 102 of FIG. 1).

I/O devices may also be connected to computing device 105 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to computing device 105 through keyboard 212 or mouse 213 and receiving output from computing device 105 via display 215 or speaker 214. Other input mechanisms may be used to input data to computing device 105 that are not shown in FIG. 2, such as display 215 having touchscreen capability and keyboard 212 being a virtual keyboard. Computing device 105 of FIG. 2 is not to be limited in scope to the elements depicted in FIG. 2 and may include fewer or additional elements than depicted in FIG. 2.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, in mixed reality environments, users may sketch virtual entities (e.g., sketch a virtual flower) in a mixed reality scene, such as via gestures. Currently, there is research in retrieving content (e.g., advertisements) based on sketches. However, current sketch processing tools are limited in retrieving the correct content based on these sketched virtual entities in the mixed reality scene.

Figure 3:
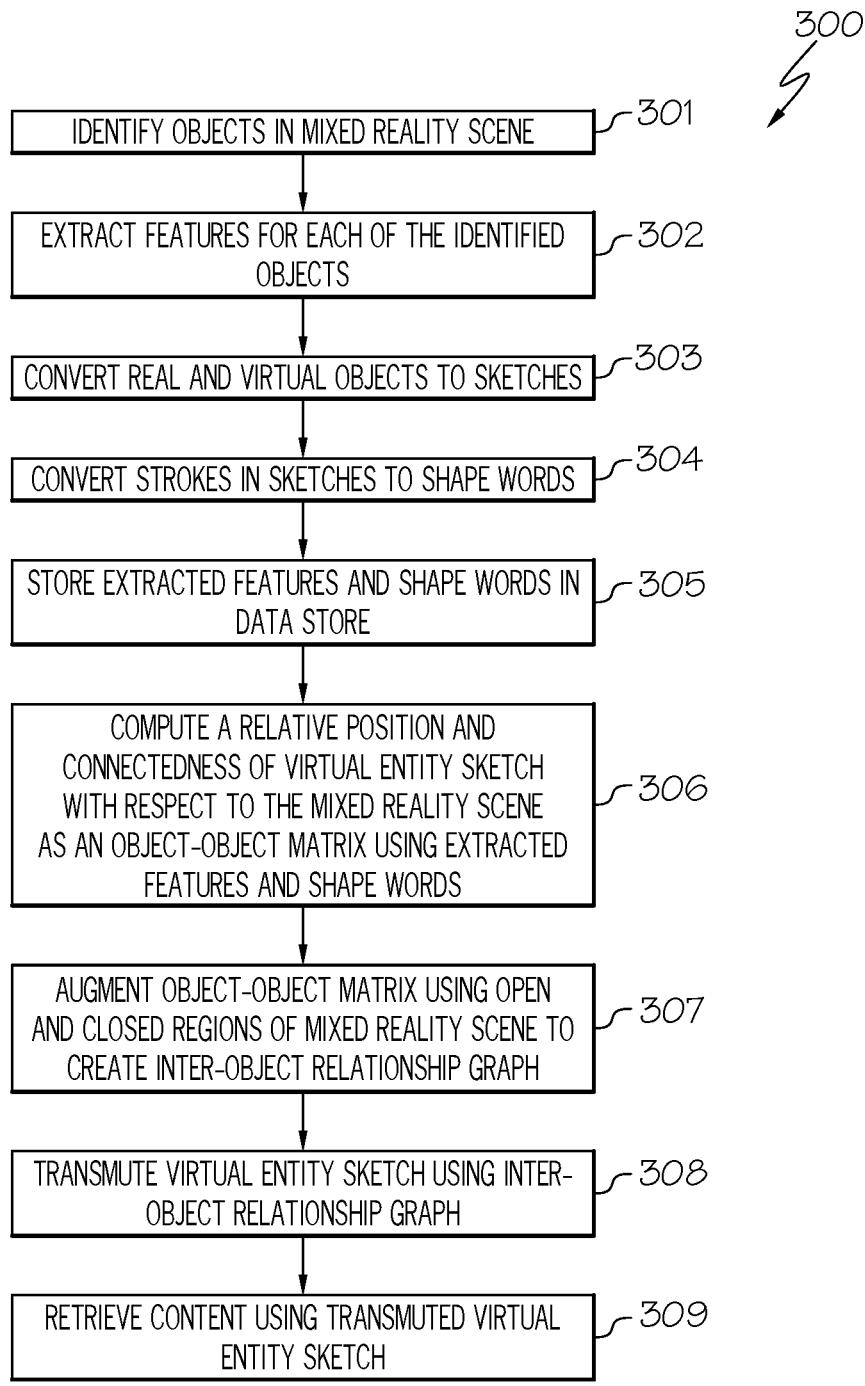
FIG. 3 is a flowchart of a method for augmenting and enriching virtual entity sketches using extracted relationships between the virtual entity sketch and the real and virtual objects in the mixed reality scene in accordance with an embodiment of the present invention.
Figure 4:
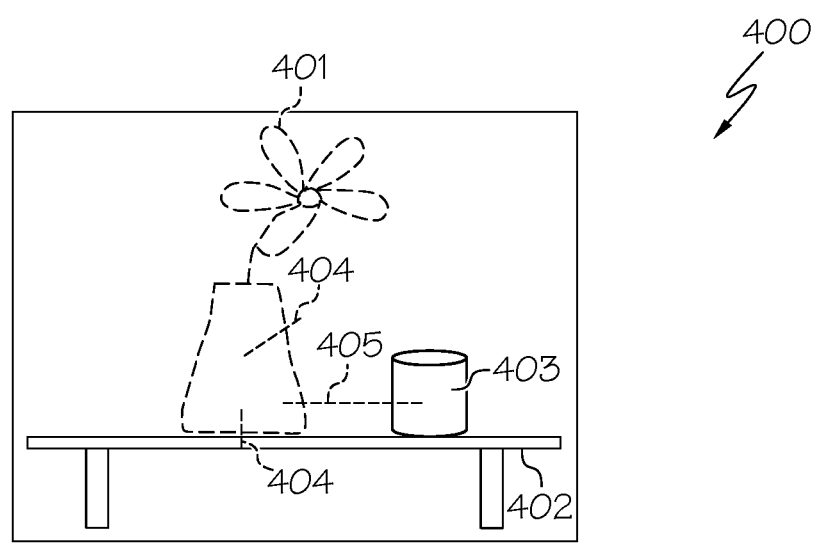
FIG. 4 illustrates a mixed reality scene containing a virtual entity sketch in accordance with an embodiment of the present invention.
Figure 6:
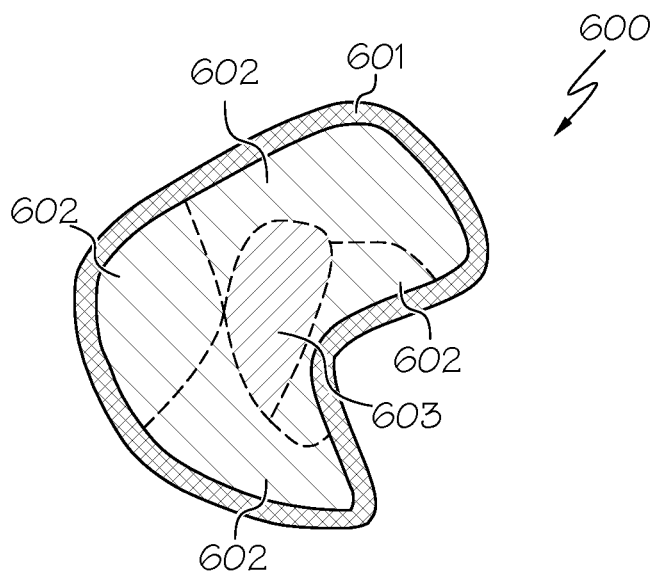
FIG. 6 illustrates regions of closed and open sets in accordance with an embodiment of the present invention.
Figure 7:
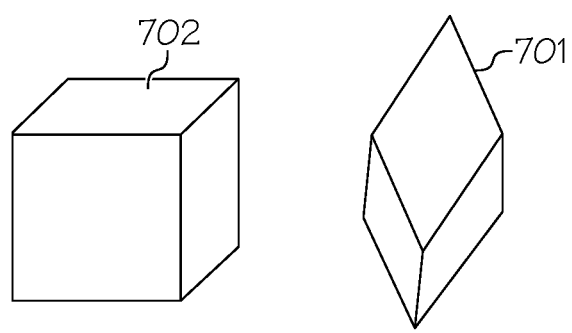
FIG. 7 illustrates an example of counter-rotating a cube to provide a semantically acceptable view in accordance with an embodiment of the present invention.

The embodiments of the present invention provide a means for retrieving the relevant and correct content based on the sketched virtual entities in the mixed reality scene by extracting relationships between the virtual entity sketch with the real world and virtual objects present in the mixed reality scene. In particular, the virtual entity sketch is transmuted using an inter-object relationship graph as discussed further below in connection with FIGS. 3-4, 5A-5D and 6-7. FIG. 3 is a flowchart of a method for augmenting and enriching virtual entity sketches using extracted relationships between the virtual entity sketch and the real and virtual objects in the mixed reality scene. FIG. 4 illustrates a mixed reality scene containing a virtual entity sketch. FIGS. 5A-5D illustrate examples of different types of object-object relationships. FIG. 6 illustrates regions of closed and open sets. FIG. 7 illustrates an example of counter-rotating a cube to provide a semantically acceptable view.

As stated above, FIG. 3 is a flowchart of a method 300 for augmenting and enriching virtual entity sketches using extracted relationships between the virtual entity sketch and the real and virtual objects in the mixed reality scene in accordance with an embodiment of the present invention.

Referring to FIG. 3, in conjunction with FIGS. 1-2, in step 301, computing device 105 identifies the objects (both real and virtual objects as well as the virtual entity sketch) in a mixed reality scene. In one embodiment, the objects that are identified include a virtual entity sketch, one or more real objects and one or more virtual objects. In one embodiment, the objects are identified using multiple depth cameras with inter-locking fields of view as discussed in Dai et al., "Scannet: Richly-Annotated 3d Reconstructions of Indoor Scenes," arXiv: 1702.04405, 2017, pp. 1-22. In one embodiment, objects are identified using structure from motion as discussed in Bao et al., "Semantic Structure from Motion," IEEE Conference on Computer Vision and Pattern Recognition, 2011, pp. 2025-2032. In another embodiment, objects are identified using simultaneous location and mapping as discussed in Tateno et al., "When 2.5 D is not Enough: Simultaneous Reconstruction, Segmentation and Recognition on Dense SLAM," IEEE Conference on Robotics and Automation (ICRA), 2016, pp. 2295-2302 and in Salas-Moreno et al., "Slam++: Simultaneous Localisation and Mapping at the Level of Objects," Proceedings of the IEEE Conference on Computer Vision and Pattern Recognition, 2013, pp. 1352-1359.

A "mixed reality scene," as used herein, refers to a segment in a mixed reality session participated by user 101. "Objects," as used herein, refer to all types of objects that are present in the mixed reality scene, including real objects (real world objects, such as a desk), virtual objects (computer generated objects, such as an avatar) and virtual entity sketches. A "virtual entity sketch," as used herein, refers to a drawing representing the features of a virtual object, such as a flower in a flower pot as shown in FIG. 4. In one embodiment, the virtual entity sketch is drawn by user 101 in the mixed reality scene, such as via gestures.

Referring to FIG. 4, FIG. 4 illustrates a mixed reality scene 400 containing a virtual entity sketch 401 in accordance with an embodiment of the present invention. As shown in FIG. 4, virtual entity sketch 401 corresponds to a flower-vase drawn on a table 402 which already has a cup 403 placed on it. A further discussion regarding FIG. 4 will be provided further below.

Returning to FIG. 3, in conjunction with FIGS. 1-2 and 4, in step 302, computing device 105 extracts features for each of the identified objects (the real and virtual objects in the mixed reality scene and the virtual entity sketch). "Features," as used herein, refer to the attributes of the objects, such as color, texture, parts, etc. In one embodiment, such features are extracted using a feature detector, such as the Scale-Invariant Feature Transform (SIFT) algorithm or the Maximally Stable Extremal Regions (MSER) algorithm. As discussed in further detail below, such features are used for style transmutation of the virtual entity sketch.

In step 303, computing device 105 converts the objects (the real and virtual objects in the mixed reality scene besides the virtual entity sketch) to sketches. That is, computing device 105 converts the real and virtual objects in the mixed reality scene (besides the virtual entity sketch) to sketches. In one embodiment, such a conversion is accomplished using an edge detector technique (e.g., Canny edge detector).

In step 304, computing device 105 converts the strokes in the sketches (the sketches of step 303) to "shape words" using a shape word descriptor as discussed in Xiao et al., "Sketch-Based Image Retrieval via Shape Words," Proceedings of the 5$^{th}$ ACM on International Conference on Multimedia Retrieval, Shanghai, China, Jun. 23-26, 2015, pp. 571-574. A "shape word," as used herein, refers to a small segment constructed by a group of connected edge pixels. For example, line segments and circular arcs may correspond to shape words.

In step 305, computing device 105 stores the extracted features and shape words in data store 108.

In step 306, computing device 105 computes a relative position and connectedness of the virtual entity sketch (e.g., virtual entity sketch 401) with respect to the mixed reality scene (e.g., mixed reality scene 400) as an object-object matrix using the extracted features and shape words.

In one embodiment, the relative "connectivity strength" between objects is determined. "Connectivity strength," as used herein, refers to how connected are the objects, such as in terms of distance and the likelihood of sharing a border.

For example, referring to FIG. 4, as the scene depicts, user 101 has drawn a flower-vase 401 on a table 402 which already has a cup 403 placed on it. Virtual entity sketch 401 is evaluated from multiple views on whether it consistently shares boundaries with other objects in mixed reality scene 400. Lines 404 and lines 405 indicate connectivity and lack of connectivity, respectively, between the sketched regions and the surrounding neighbourhood (nearby objects).

Based on fuzzy connectivity, an object-object matrix is computed which is assigned an objective function. Fuzzy connectivity defines how image elements hang together spatially in spite of their gradation of intensities. In one embodiment, the objective function computes the fuzzy connectedness value based on the relative distance between the object pair (e.g., the virtual entity sketch and a real object in the mixed reality scene), and the likelihood that they share a border (appearing to share border is not the same as actually sharing a border). A discussion regarding using fuzzy connectedness for image segmentation is provided in Udupa et al., "Fuzzy Connectedness and Image Segmentation," Proceedings of the IEEE, Vol. 91, No. 10, October 2003, pp. 1649-1669.

In step 307, computing device 105 augments the object-object matrix using open and closed regions of the mixed reality scene (e.g., mixed reality scene 400) to create an inter-object relationship graph.

Prior to discussing the inter-object relationship graph, a brief discussion regarding different types of object-object relationships is deemed appropriate.

Referring now to FIGS. 5A-5D, FIGS. 5A-5D illustrate examples of different types of object-object relationships in accordance with an embodiment of the present invention.

Figure 5A:
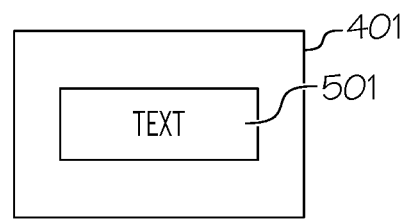
FIGS. 5A-5D illustrate examples of different types of object-object relationships in accordance with an embodiment of the present invention.
Figure 5B:
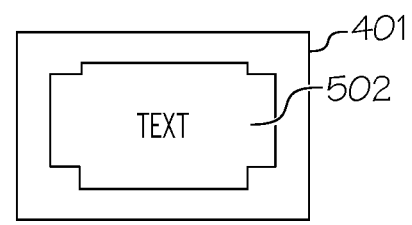
Figure 5C:
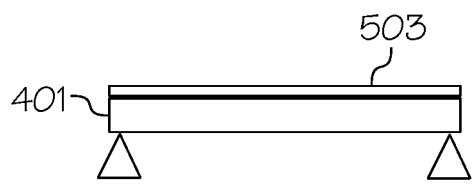
Figure 5D:
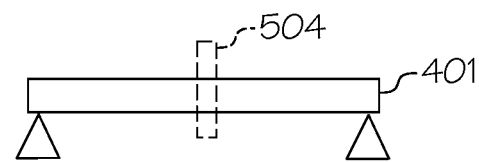

As shown in FIG. 5A, virtual entity sketch 401 could be overlaid with another object, such as text 501. Furthermore, as shown in FIG. 5B, virtual entity sketch 401 could be engraved with another object, such as text 502. Additionally, as shown in FIG. 5C, virtual entity sketch 401 could be overlaid with another object 503. Furthermore, as shown in FIG. 5D, virtual entity sketch 401 could be embedded with another object 504.

In order to capture these relationships, the concept of open and closed sets is leveraged. For example, consider the regions shown in FIG. 6. FIG. 6 illustrates regions 600 of closed and open sets in accordance with an embodiment of the present invention.

Referring to FIG. 6, the border pixels of regions 601 constitute open ended sub-regions as the edge fades away into the continuum of its background. When two objects share a border, they also share the pixels of their interfacing sub-region. On the other hand, pixels 602 are the interior pixels of the region. In contrast, region 603 has only interior points and is not exposed to any outside objects.

In one embodiment, "closed regions," are defined as those that contain only interior pixels; whereas, "open regions" are defined as those which contain interior and border pixels.

In one embodiment, the object-object matrix discussed above is then used to generate an inter-object relationship graph with edges labelled using the fuzzy connectedness strength and one of the following relationships: (1) if a pair of objects only share the open-ended sub-region containing the border pixels, then the object-pair is treated as an over-lay/appendage of each other, (2) if object A shares an interface with open and/or closed regions of another object B, but is contained within it, then "A is engraved/contained in B," and (3) if object A shares an interface with open and/or closed regions of another object B, but is not contained within it, then "A is embedded in B."

Referring to FIG. 3, in conjunction with FIGS. 1-2, 4, 5A-5D and 6, in step 308, computing device 105 transmutes the virtual entity sketch (e.g., virtual entity sketch 401) using the inter-object relationship graph.

In one embodiment, the transmutation of a given virtual entity sketch is accomplished using neuro-aesthetic principles. In connection with transmuting the virtual entity sketch, the features of the fuzzy connected objects may be mapped to various regions of the virtual entity sketch, which are used for neuro-aesthetic transmutation.

In one embodiment, the transmutation of the virtual entity sketch is accomplished by identifying regions in the sketch. The sketch is segmented into regions using an image segmentation technique. Next, these regions are used to cluster the objects to which the regions share connectivity. The virtual entity sketch is then transmuted with respect to the mixed reality scene 400 using rules of artistic experience, such as discussed in Ramachandran et al., "The Science of Art: A Neurological Theory of Aesthetic Experience," Journal of Consciousness Studies, Vol. 6, No. 6-7, 1999, pp. 15-51.

In one embodiment, the transmutation of the virtual entity sketch (e.g., virtual entity sketch 401) involves a transmutation of one or more of the following features of the virtual entity sketch: contrast, symmetry, style, aspect ratio and viewpoint.

For example, while applying style to the sketch region, the style coloring is modified to produce contrast with respect to its connected neighbors. For example, the color of flower-vase 401 may be chosen to contrast with its front-view neighbor, the color of the wall in the background. In one embodiment, color harmonization could be utilized for this purpose as discussed in Cohen-Or et al., "Color Harmonization," ACM Transactions on Graphics, Vol. 25, No. 3, 2006, pp. 624-630.

In a further example, virtual entity sketches could be stylized to blend with the background to make the experience of discovering them challenging, such as stylizing a sketch to blend with the sofa background so as to make it hard to notice. Such adaptations could be applied based on user feedback.

In another example, the virtual entity sketch (e.g., virtual entity sketch 401) could be corrected to restore symmetry wherever it is missing, such as using AutoDraw®.

In a further example, the style of the virtual entity sketch could be chosen to "blend" with its group (neighboring objects). This is referred to herein as "grouping." In one embodiment, the shape word feature matching could be used to infer such groupings. For example, if the virtual entity sketch is a fruit drawn within a physical fruit bowl object, then the sketch may be colored to match the other fruits with the same ambient light as reflected by the other fruits, such as using the technique discussed in Luan et al., "Deep Photo Style Transfer," arXiv: 1703.07511, 2017, pp. 1-9.

In another example, the aspect ratio of the virtual entity sketch or sketch regions could be adapted slightly based on past feedback so as to grasp the attention of other viewers of the sketch. This is referred to herein as the "peak shift and isolation principle."

In a further example, the viewpoint of the virtual entity sketch could be adapted. For instance, if the user's view of the virtual entity sketch is obscured or distorted, then the sketch is rotated adaptively with respect to the user's view so as to provide a "semantically acceptable view" as shown in FIG. 7. FIG. 7 illustrates an example of counter-rotating a cube to provide a semantically acceptable view in accordance with an embodiment of the present invention. For example, as shown in FIG. 7, cube 701 does not appear to be like a cube. As a result, cube 701 is counter-rotated to provide a semantically acceptable view as shown by cube 702.

Transmutation of the virtual entity sketch may also be accomplished by associating objects to the virtual entity sketch. Such transmutation is referred to herein as the principle of "visual metaphors and perceptual problem solving."

For example, objects may be associated with sketches so as to augment their aesthetics. For instance, an aura could be sketched around an avatar to give an angelic effect. In another example, the virtual entity sketch could be augmented with lighting to provide the desired effect. This is an example of sketch-augmentation as a visual metaphor. Alternatively, as discussed above, virtual entity sketches could be stylized to blend with the background to make the experience of discovering them challenging, such as stylizing a sketch to blend with the sofa background so as to make it hard to notice. Such adaptations could be applied based on user feedback.

Returning to FIG. 3, in conjunction with FIGS. 1-2, 4, 5A-5D and 6-7, in step 309, computing device 105 retrieves content, such as advertisements, using the transmuted virtual entity sketch.

As a result of the present invention, content that is more relevant to the user can be retrieved based on augmenting and enriching the virtual entity sketch (transmuted virtual entity sketch) with the extracted relationships between the virtual entity sketch and the real and virtual objects within the mixed reality scene. By transmuting the virtual entity sketch, a more accurate assessment of the virtual entity sketch can be achieved, such as answering the questions of what constitutes the virtual entity sketch, why was it drawn in the mixed reality scene, how does it relate to the other objects in the mixed realty scene, etc. By acquiring a more accurate assessment of the virtual entity sketch, relevant content may then be retrieved.

The present invention improves the technology or technical field involving mixed reality environments and content retrieval. As discussed above, in mixed reality environments, users may sketch virtual entities (e.g., sketch a virtual flower) in a mixed reality scene, such as via gestures. Currently, there is research in retrieving content (e.g., advertisements) based on sketches. However, current sketch processing tools are limited in retrieving the correct content based on these sketched virtual entities in the mixed reality scene.

Such a problem is a technical problem since it involves computing technology.

The present invention addresses such a technical problem by improving the technology of retrieving content with respect to mixed reality environments by extracting features for the objects (real and virtual objects as well as the virtual entity sketch) in the mixed reality scene and converting such objects (real and virtual objects besides the virtual entity sketch) into sketches, where the strokes in the sketches are converted to shape words. These extracted features and shape words are used to compute a relative position and connectedness of the virtual entity sketch with respect to the mixed reality scene as an object-object matrix. The object-object matrix is then augmented using open and closed regions of the mixed reality scene to create an inter-object relationship graph. The virtual entity sketch is then transmuted using such an inter-object relationship graph. By transmuting the virtual entity sketch with the extracted relationships between the virtual entity sketch and the real and virtual objects within the mixed reality scene, more relevant content may be retrieved based on the virtual entity sketch.

The technical solution provided by the present invention cannot be performed in the human mind or by a human using a pen and paper. That is, the technical solution provided by the present invention could not be accomplished in the human mind or by a human using a pen and paper in any reasonable amount of time and with any reasonable expectation of accuracy without the use of a computer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for enriching user sketched virtual objects in mixed reality scenes to provide more relevant content, the method comprising:
    identifying objects in a mixed reality scene, wherein said objects comprise a virtual entity sketch, one or more real objects and one or more virtual objects;
    extracting features for each of said identified objects;
    computing a relative position and connectedness of said virtual entity sketch with respect to said mixed reality scene as an object-object matrix using said extracted features;
    augmenting said object-object matrix using open and closed regions of said mixed reality scene to create an inter-object relationship graph; and
    transmuting said virtual entity sketch using said inter-object relationship graph.

2. The method as recited in claim 1 further comprising:
    retrieving content using said transmuted virtual entity sketch.

3. The method as recited in claim 1 further comprising:
    converting said identified real and virtual objects to sketches using an edge detector technique;
    converting strokes of said sketches to shape words using a shape word descriptor;
    storing said extracted features and said shape words in a data store; and
    computing said relative position and connectedness of said virtual entity sketch with respect to said mixed reality scene as said object-object matrix using said extracted features and said shape words.

4. The method as recited in claim 1, wherein said closed regions are regions containing only interior pixels, wherein said open regions are regions containing interior and border pixels.

5. The method as recited in claim 1 further comprising:
    segmenting said virtual entity sketch into regions; and
    clustering objects to which said regions share connectively.

6. The method as recited in claim 1, wherein said transmutation of said virtual entity sketch involves a transmutation of one or more of the following features of said virtual entity sketch: contrast, symmetry, style, aspect ratio and viewpoint.

7. The method as recited in claim 1, wherein said transmutation of said virtual entity sketch comprises one or more of the following: grouping, peak shift and isolation principle, visual metaphors and perceptual problem solving.

8. A computer program product for enriching user sketched virtual objects in mixed reality scenes to provide more relevant content, the computer program product comprising a computer readable storage medium having program code embodied therewith, the program code comprising the programming instructions for:
identifying objects in a mixed reality scene, wherein said objects comprise a virtual entity sketch, one or more real objects and one or more virtual objects;
extracting features for each of said identified objects;
computing a relative position and connectedness of said virtual entity sketch with respect to said mixed reality scene as an object-object matrix using said extracted features;
augmenting said object-object matrix using open and closed regions of said mixed reality scene to create an inter-object relationship graph; and
transmuting said virtual entity sketch using said inter-object relationship graph.

9. The computer program product as recited in claim 8, wherein the program code further comprises the programming instructions for:
retrieving content using said transmuted virtual entity sketch.

10. The computer program product as recited in claim 8, wherein the program code further comprises the programming instructions for:
converting said identified real and virtual objects to sketches using an edge detector technique;
converting strokes of said sketches to shape words using a shape word descriptor;
storing said extracted features and said shape words in a data store; and
computing said relative position and connectedness of said virtual entity sketch with respect to said mixed reality scene as said object-object matrix using said extracted features and said shape words.

11. The computer program product as recited in claim 8, wherein said closed regions are regions containing only interior pixels, wherein said open regions are regions containing interior and border pixels.

12. The computer program product as recited in claim 8, wherein the program code further comprises the programming instructions for:
segmenting said virtual entity sketch into regions; and
clustering objects to which said regions share connectively.

13. The computer program product as recited in claim 8, wherein said transmutation of said virtual entity sketch involves a transmutation of one or more of the following features of said virtual entity sketch: contrast, symmetry, style, aspect ratio and viewpoint.

14. The computer program product as recited in claim 8, wherein said transmutation of said virtual entity sketch comprises one or more of the following: grouping, peak shift and isolation principle, visual metaphors and perceptual problem solving.

15. A system, comprising:
a memory for storing a computer program for enriching user sketched virtual objects in mixed reality scenes to provide more relevant content; and
a processor connected to said memory, wherein said processor is configured to execute the program instructions of the computer program comprising:
identifying objects in a mixed reality scene, wherein said objects comprise a virtual entity sketch, one or more real objects and one or more virtual objects;
extracting features for each of said identified objects;
computing a relative position and connectedness of said virtual entity sketch with respect to said mixed reality scene as an object-object matrix using said extracted features;
augmenting said object-object matrix using open and closed regions of said mixed reality scene to create an inter-object relationship graph; and
transmuting said virtual entity sketch using said inter-object relationship graph.

16. The system as recited in claim 15, wherein the program instructions of the computer program further comprise:
retrieving content using said transmuted virtual entity sketch.

17. The system as recited in claim 15, wherein the program instructions of the computer program further comprise:
converting said identified real and virtual objects to sketches using an edge detector technique;
converting strokes of said sketches to shape words using a shape word descriptor;
storing said extracted features and said shape words in a data store; and
computing said relative position and connectedness of said virtual entity sketch with respect to said mixed reality scene as said object-object matrix using said extracted features and said shape words.

18. The system as recited in claim 15, wherein said closed regions are regions containing only interior pixels, wherein said open regions are regions containing interior and border pixels.

19. The system as recited in claim 15, wherein the program instructions of the computer program further comprise:
segmenting said virtual entity sketch into regions; and
clustering objects to which said regions share connectively.

20. The system as recited in claim 15, wherein said transmutation of said virtual entity sketch involves a transmutation of one or more of the following features of said virtual entity sketch: contrast, symmetry, style, aspect ratio and viewpoint.

* * * * *